Sept. 25, 1928.  
A. W. BRYNGELSON  
ROUNDABOUT  
Filed June 29, 1926  
1,685,627  
2 Sheets-Sheet 1
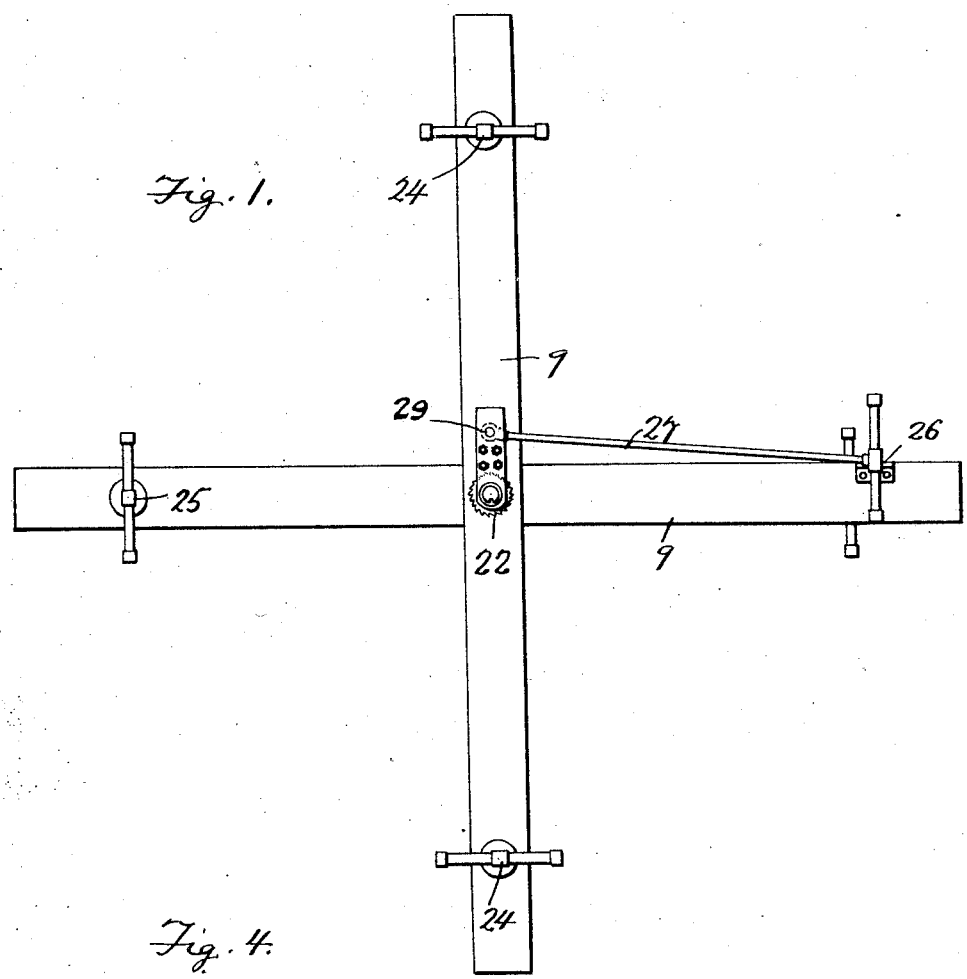
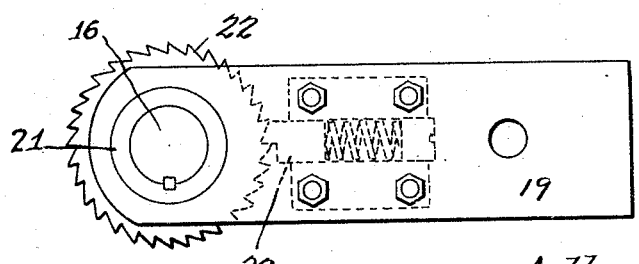
Inventor  
*Arthur W. Bryngelson,*  
By *Clarence A. O'Brien*  
Attorney Sept. 25, 1928.

A. W. BRYNGELSON

ROUNDABOUT

Filed June 29, 1926  2 Sheets-Sheet 2

1,685,627

Inventor
Arthur W. Bryngelson

By Clarence A. O'Brien
Attorney

Patented Sept. 25, 1928.

1,685,627

UNITED STATES PATENT OFFICE.

ARTHUR W. BRYNGELSON, OF AUGUSTA, GEORGIA.

ROUNDABOUT.

Application filed June 29, 1926. Serial No. 119,347.

This invention relates to roundabouts and has for its primary object to provide efficient and improved means whereby the device may be rotated by one of the children seated thereon, and this without requiring any unusual exertion on his part.

A further object of the invention is to improve and simplify the general construction of roundabouts of the manually controlled type.

Other objects will become apparent as the nature of the invention is better understood the same comprising the novel form, combination, and arrangement of parts hereinafter more fully described, shown in the accompanying drawings and claimed.

In the drawings wherein like numerals indicate like parts throughout the several views:

Figure 1 is a top plan view of a roundabout constructed in accordance with the present invention.

Figure 4 is an enlarged top plan view of a ratchet unit that forms an important part of the present invention.

Figure 2:
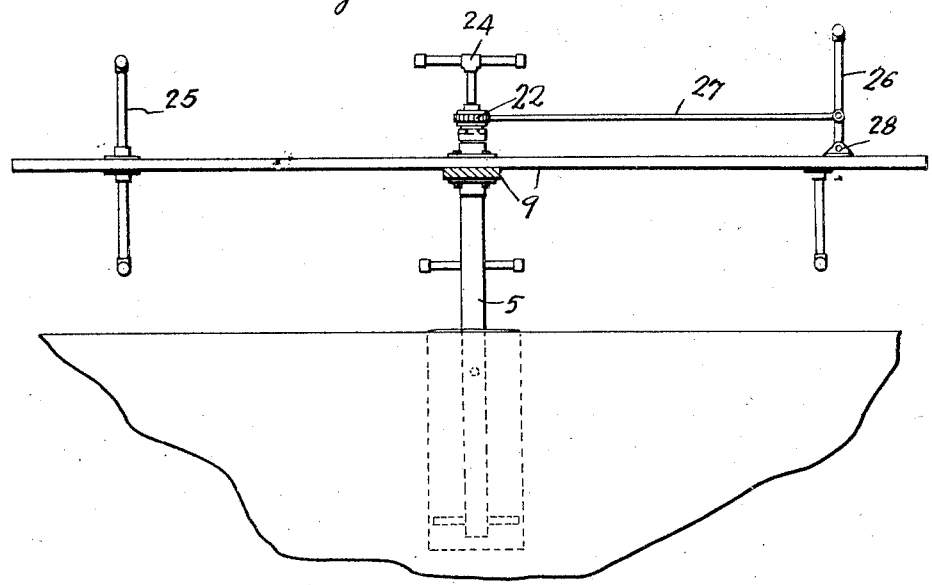
Figure 2 is a side elevation thereof.

Now having particular reference to the drawings, my novel roundabout constitutes the provision of a solid post 5 which is of stationary construction, mounted vertically within the ground or other support as suggested by the dotted lines in Figure 2. The upper end of the post is of reduced area as indicated at 6, for providing a circumferential shoulder within which is a channel 7 for receiving the ball bearings 8.

The roundabout further consists of a pair of right angularly crossed seat boards 9—9 that are interconnected centrally by a pair of metallic plates 10—10 through which as well as said boards 9—9 are registering openings to permit the same to be mounted upon the post 5 for rotation thereon. The outer faces of the plates 10—10 are formed with collars 11—11 that surround the openings for bracing the connection between the seat boards and said post. The end of the collar 11 of the lowermost plate 10 is formed with a channel for receiving said bearings 8, while the collar 11 of the top plate is formed with a circumferential channel 12 that tapers downwardly toward the center thereof, and within which are arranged ball bearings 13. Threaded upon the post 5 directly above this collar 12 is a bearing annulus 14, the bottom surface of which is also tapered complementary to the tapered channel of the collar and held in spaced relation therewith by reason of said bearings 13. A locking ring 15 is provided for preventing the annulus becoming loose upon the post. By reason of the bearings between the post 5 and the seat board attaching plates, the free rotation of the boards upon the posts will be permitted.

Figure 3:
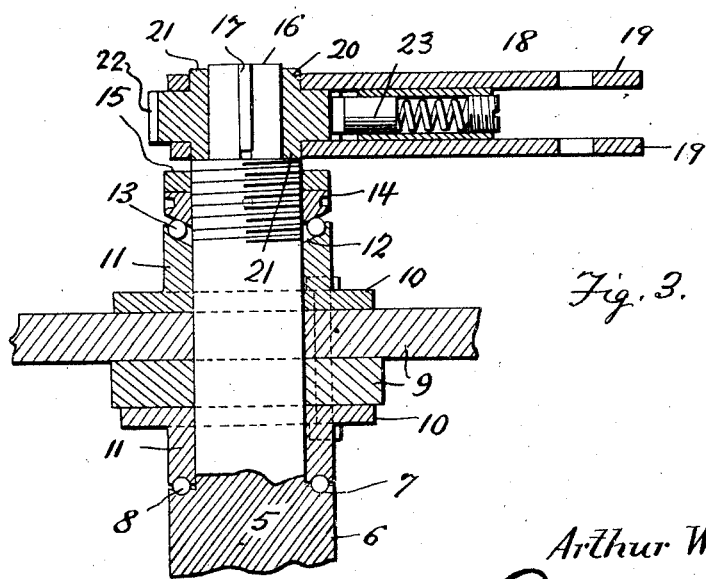
Figure 3 is an enlarged detail section through the center of the device for more clearly disclosing the actuating mechanism of the roundabout.

The extreme upper end of the post 5 is formed with a reduced extension 16 that is in turn formed with a vertical T-slot 17 and upon which is arranged a ratchet unit designated in its entirety by the reference character 18. This ratchet unit constitutes the provision of a pair of elongated metallic plates 19—19 that are formed adjacent certain ends with registering openings 20 within which are arranged circular bosses 21—21 upon opposite sides of a ratchet disc 22. Arranged between the plates 19—19 in back of the ratchet disc is a spring pressed ratchet dog 23. The ratchet disc 22 is keyed to the post extension 16 as clearly disclosed in Figure 3.

Extending vertically through one of the boards 9 adjacent the opposite ends thereof are vertical posts 24—24 while extending vertically through the other board 9 adjacent one of its ends is a post 25, all of said posts being equipped at their upper and lower ends with cross handle and foot bars as disclosed in Figures 1 and 2. Loosely pivoted to the last mentioned board 9 adjacent its other end as at 28 is a vertical handle post 26 to which is loosely pivotally secured one end of the rod 27 that extends inwardly of the roundabout and is in turn loosely pivotally connected at its inner end to a vertical member 29 between the plates 19—19 of the ratchet unit. Obviously by actuating the post 26 the plates 19—19 of the ratchet unit will be actuated so as to ratchet the dog 23 over the ratchet disc 22 resulting in the rotation of the boards upon the post 5.

It will thus be seen that I have provided a highly novel, simple and efficient form of roundabout that is well adapted for all the purposes heretofore designated, even though I have herein shown and described this roundabout as consisting of certain detail structural elements, it is nevertheless to be understood that some departures may be had without affecting the spirit and scope of the appended claim.

Having thus described the invention, what I claim as new is:—

In a roundabout of the class described, a vertical stationary supporting post, a pair of cross seat boards mounted for rotation upon the post below the upper end thereof, a ratchet unit including a disc keyed on the upper end of the post, ratchet teeth formed in the outer peripheral edge of said disc, bosses formed on the opposite sides of the disc, a pair of spaced metallic plates disposed on opposite sides of the disc, the inner ends of said plates being formed with openings to accommodate the respective bosses, said plates being rotatable around the bosses, a spring pressed pawl arranged between the plates for normal engagement with the ratchet teeth of said disc, a vertical pin extending between the outer ends of the plates, posts carried by the outer end of said cross board, and means upon the outer end of one of the cross boards for actuating said plates to effect the rotation of the cross boards, said means including a vertical lever loosely pivoted at its lower end on said board, and a rod loosely connected at one end to the lever adjacent its pivoted end, the other end of said rod being loosely connected to the pin between the outer ends of the plates.

In testimony whereof I affix my signature.

ARTHUR W. BRYNGELSON.